March 15, 1960 H. J. KIRCHER ET AL 2,928,236
ROCKET ENGINE INJECTOR
Filed Jan. 14, 1957 2 Sheets-Sheet 2
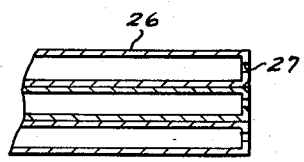
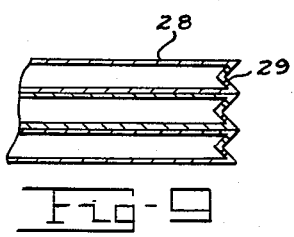
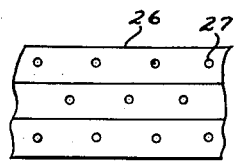
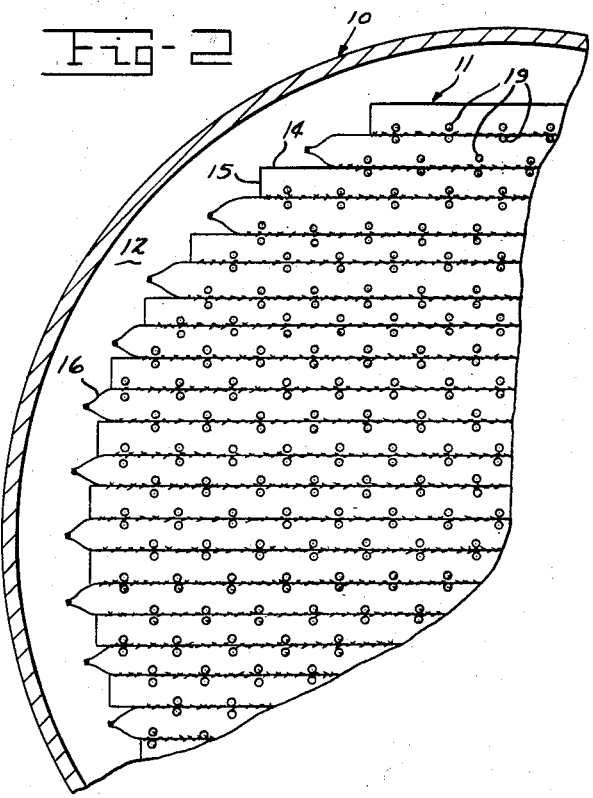
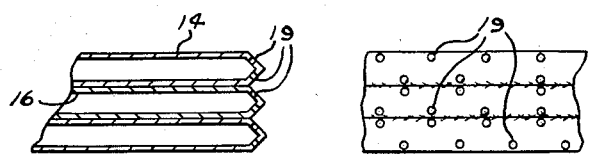
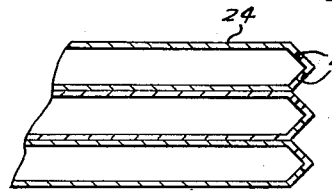
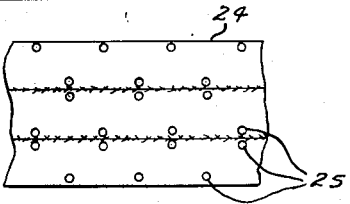
INVENTORS
HARTMANN J. KIRCHER
STANLEY LEHRER
BY Wade Krout
Frank C. Leach Jr.
ATTORNEYS

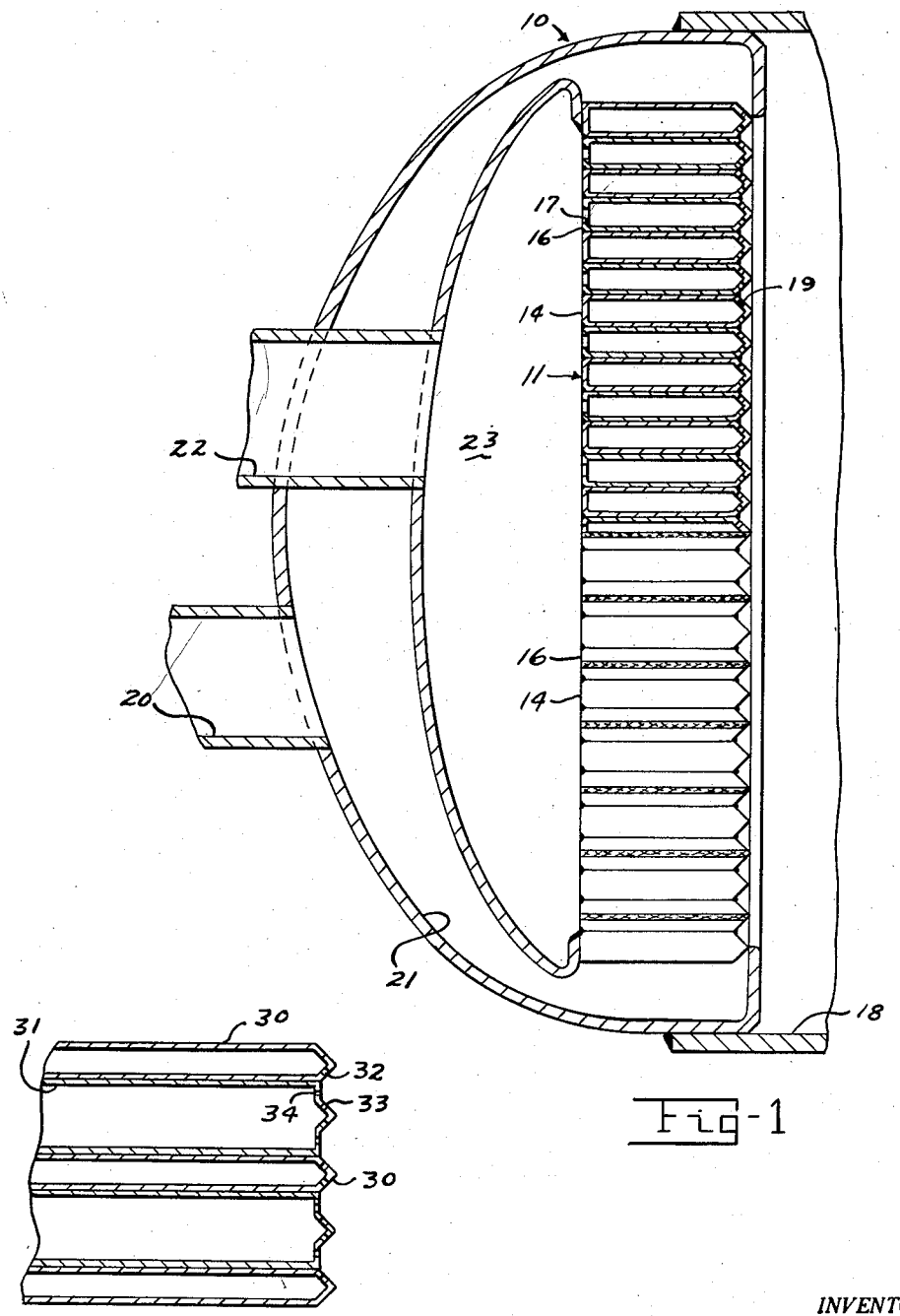

United States Patent Office 2,928,236
Patented Mar. 15, 1960

2,928,236

ROCKET ENGINE INJECTOR

Hartmann J. Kircher, Sparta, and Stanley Lehrer, Pompton Lakes, N.J., assignors to the United States of America as represented by the Secretary of the Air Force Application January 14, 1957, Serial No. 634,132

9 Claims. (Cl. 60—35.6)

This invention relates to a rocket engine and, more particularly, to an injector for supplying propellants to the combustion chamber of a rocket engine.

Two propellants such as fuel and liquid oxygen, for example, are usually supplied to the combustion chamber of a rocket engine to produce combustion therein. It is necessary that the two propellants intermingle as soon as possible after entering the combustion chamber to create maximum combustion efficiency therein. The intermingling of the two propellants upon their entry into the combustion chamber may be increased by supplying the propellants in adjacent streams. One method of supplying the propellants in adjacent streams has been to employ annular concentric members with the propellants being supplied to the combustion chamber from adjacent members, but such an arrangement requires a complex manifold design. The present invention uses a simplified manifold design and thereby eliminates the problem of complex manifold design in supplying propellants in adjacent streams.

Another problem when using annular concentric members in the injector is the machining and drilling of the orifices through which the propellants are supplied. The annular concentric members require a precise arrangement for drilling and such, of course, increases the cost of the injector. The present invention employs tubes of rectangular cross section that permits machining and drilling of the orifices in the injector with greater ease.

The use of annular concentric members also limits the selection of an injection pattern. To increase the size of the orifice, for example, in using the annular concentric members may require a complete change in the size of all of the members. The present invention permits the use of any type of injection pattern merely by varying the tube width.

An object of this invention is to provide a propellant passage construction for an injector for a rocket engine in which various types of injection patterns may be obtained from a single basic construction.

Other objects of this invention will be readily perceived from the following description.

This invention relates to an injector for a rocket engine. The injector comprises a plurality of tubes secured to each other to form a tube bundle and extending substantially the width of the injector. The tubes are divided into two sets with each set of tubes receiving a different propellant. Each set of tubes comprises alternate tubes of the tube bundle. One set of tubes has a first propellant supplied thereto by suitable means. The other set of tubes has a second propellant supplied thereto by suitable means. Each of the tubes has orifices therein to allow flow of the propellant therefrom.

The attached drawings illustrate preferred embodiments of the invention, in which Fig. 1 is a sectional view of the injector of the present invention;

Fig. 2 is a fragmentary end elevational view of the injector of Fig. 1;

Fig. 3 is a fragmentary sectional view of the tube construction of Fig. 1;

Fig. 4 is a fragmentary end elevational view of the tube construction of Fig. 3;

Fig. 5 is a fragmentary sectional view of a modified tube construction;

Fig. 6 is a fragmentary end elevational view of the tube construction of Fig. 5;

Fig. 7 is a fragmentary sectional view of another form of tube construction;

Fig. 8 is a fragmentary end elevational view of the tube construction of Fig. 7;

Fig. 9 is a fragmentary sectional view of another type of tube construction; and Fig. 10 is a fragmentary sectional view of still another form of tube construction.

Referring to the drawings and particularly Fig. 1, there is shown a casing 10 of circular cross section secured by suitable means such as welding or brazing, for example, to a combustion chamber 18 of a rocket engine. The casing has a plurality of tubes, which have propellant supplied therethrough to the combustion chamber 18, secured to each other by welding, brazing, or other suitable process to form a tube bundle 11 substantially perpendicular to the axis of the rocket engine. As shown in Fig. 2, the tubes extend substantially the width of the interior of the casing 10 but are spaced therefrom to form an annular passage 12 therebetween. Alternate tubes 14 of the tube bundle 11 have openings 15 in their side walls to permit communication between the passage 12 and the interior of the tubes 14. The remaining alternate tubes 16 have openings 17 in their walls remote from the combustion chamber 18. The side walls of the tubes 16 are closed as shown in Fig. 2.

Each of the tubes 14 and 16 has orifices or openings 19 in its wall adjacent the combustion chamber 18 to permit the flow of propellants from the interior of the tubes 14 and 16 to the interior of the combustion chamber 18. As shown more clearly in Fig. 3, the orifices 19 in one tube have their axes at right angles to the axes of the orifices 19 in the next adjacent tube. This results in the propellant flowing from the orifice 19 in one tube intersecting the propellant stream flowing from the orifice 19 in the adjacent tube at substantially right angles to thereby increase the intermingling of the two propellants.

One of the propellants is supplied to the annular passage 12 from a suitable source (not shown) through a conduit 20 and a passage 21 in the casing 10. The propellant flows from the passage 12 through the openings 15 into the tubes 14, through the tubes 14, and the orifices 19 into the interior of the combustion chamber 18. A second propellant is supplied to the other set of tubes 16 through a conduit 22 from a suitable source (not shown). The second propellant flows from the conduit 22 through a chamber 23 and the openings 17 in the walls of the tubes 16 into the interior thereof. The propellant flows into the interior of the combustion chamber 18 through the orifices 19 in the walls of the tubes 16.

Considering the operation of the present invention, one of the propellants is supplied to the set of tubes 14 through the conduit 20 and the annular passage 12. The other set of tubes 16 has its propellant supplied through the conduit 22 and the chamber 23. The two propellants enter the combustion chamber 18 in adjacent streams and intermingle as soon as entering the chamber to thereby increase the combustion efficiency.

While the casing 10 has been described as being circular in cross section, it will be understood that it may be of any other type of cross-sectional configuration, if desired.

Likewise, while the tubes 11 have been shown and described as rectangular in cross section, it will be understood that the tubes could have other cross-sectional configurations. It is only necessary that the tubes be secured together in such a relationship that adjacent tubes have different propellants supplied thereto so that the different propellants enter the combustion chamber 18 in adjacent streams and thereby intermingle as quickly as possible. It also should be noted that the passage 12 need not be necessarily annular but only that the passage 12 be provided between the interior of the casing 10 and the ends of the tubes 11.

The tube construction of Figs. 3 and 4 shows the relationship of the tubes and the orifices therein when a fine injection pattern is desired. If a coarse injection pattern is desired, it is only necessary that the width of the tubes be increased as shown by the tubes 24 in Figs. 5 and 6. Each of these tubes 24 has orifices 25 therein of greater diameter than the orifices 19 of Figs. 3 and 4. Thus, the same basic construction is employed in either modification but a completely different injection pattern results therefrom.

Figs. 7 and 8 show tubes 26 having orifices 27 that allow the propellant to flow therefrom in a parallel stream to the propellants in the adjacent streams rather than at substantially right angles thereto as in Figs. 3 and 5. The tubes 26 are substantially the same width as the tubes of Figs. 3 and 4 but a different injection pattern results from using this showerhead type of orifice arrangement. It will be understood that the width of the tubes 26 could be the same as the tube width of the tubes 24 of Figs. 5 and 6 if a larger orifice were desired.

The tubes 28 of Fig. 9 are substantially the same width as the tubes of Figs. 3 and 4. However, the orifices 29 of the tubes 28 are so arranged that adjacent streams of the same propellant flowing from two orifices in the same tube intersect rather than streams of adjacent propellants intersecting. Such pattern is known as a like on like arrangement.

In Fig. 10, the tubes 30 have substantially the same width as the tubes of Figs. 3 and 4. However, the alternate tubes 31 between the tubes 30 have a much greater width than the tubes 30. The tubes 30 have a plurality of orifices 32 in the wall thereof adjacent the combustion chamber to permit propellant flow therefrom. The tubes 31 have a set of orifices 33, which are at substantially right angles to the orifices 32 in the tube 30. The tube 31 also has a second set of orifices 34. The axes of the orifices 34 are substantially parallel to the axes of the tubes 30 and 31. Thus, the propellant flowing from the tubes 31 flows through the orifices 33 and 34 to intermingle with the stream of propellant flowing from the tubes 30 through the orifices 32. This arrangement produces a two on one injection pattern, which may be employed when it is desired to supply a greater quantity of one propellant than the other, for example. It also will be understood that the size of the orifices 32, 33 and 34 may be varied as desired.

The present invention has the advantage of producing either a coarse or fine injection pattern merely by varying the width of the tube. The present invention is less expensive in drilling orifices in a tube since a minimum of tooling is needed because all of the orifices in the tube are drilled along a single straight line. Another advantage of this invention is that it reduces the complexity of the manifold design for a rocket engine.

For purposes of exemplification, particular embodiments of the invention have been shown and described according to the best present understanding thereof. However, changes and modifications in the arrangement and construction of the parts thereof may be resorted to without departing from the true spirit and scope of the invention.

We claim:
1. An injector for a rocket engine having a combustion chamber comprising a casing, a plurality of tubes secured to each other to form a tube bundle, each of said tubes extending substantially the width of the casing, alternate tubes of said tube bundle having openings in their side walls, the remaining alternate tubes of said tube bundle having openings in their walls remote from the combustion chamber, means to supply a first propellant through the openings in the side walls of the alternate tubes into the interior of the alternate tubes, and means to supply a second propellant through the openings in the walls of the remaining alternate tubes into the interior of the remaining alternate tubes, each of said tubes having a plurality of orifices in its wall adjacent the combustion chamber whereby propellant flows therethrough into the combustion chamber.

2. An injector for a rocket engine having a combustion chamber comprising a casing, a plurality of tubes secured to each other to form a tube bundle substantially perpendicular to the axis of the engine, each of said tubes extending substantially the width of the casing, alternate tubes of said tube bundle having openings in their side walls, the remaining alternate tubes of said tube bundle having openings in their walls remote from the combustion chamber, means to supply a first propellant through the openings in the side walls of the alternate tubes into the interior of the alternate tubes, and means to supply a second propellant through the openings in the walls of the remaining alternate tubes into the interior of the remaining alternate tubes, each of said tubes having a plurality of orifices in its wall adjacent the combustion chamber whereby propellant flows therethrough into the combustion chamber.

3. An injector according to claim 1 in which the tubes are rectangular in cross section.

4. An injector according to claim 2 in which the tubes are rectangular in cross section.

5. An injector for a rocket engine having a combustion chamber comprising a casing of circular cross section, a plurality of tubes secured to each other and mounted in the casing, said tubes being spaced from the interior of the casing to form a substantially annular passage therebetween, alternate tubes of said plurality of tubes having openings in their side walls to provide communication between the annular passage and the interior of the tubes, means to supply a first propellant to the annular passage and through the openings in the side walls of the alternate tubes to the interior of the tubes, the remaining alternate tubes of the plurality of tubes having openings in their walls remote from the combustion chamber, means to supply a second propellant to the interior of the remaining alternate tubes through the openings in the walls remote from the combustion chamber, and each of said tubes having a plurality of orifices in its wall adjacent the combustion chamber whereby propellant flows from the interior thereof into the combustion chamber.

6. An injector for a rocket engine having a combustion chamber comprising a casing of circular cross section, a plurality of tubes secured to each other and mounted in the casing, said tubes being arranged substantially perpendicular to the axis of the engine, said tubes being spaced from the interior of the casing to form a substantially annular passage therebetween, alternate tubes of said plurality of tubes having openings in their side walls to provide communication between the annular passage and the interior of the tubes, means to supply a first propellant to the annular passage and through the openings in the side walls of the alternate tubes to the interior of the tubes, the remaining alternate tubes of the plurality of tubes having openings in their walls remote from the combustion chamber, means to supply a second propellant to the interior of the remaining alternate tubes through the openings in the walls remote from the combustion chamber, and each of said tubes having a plurality of orifices in its wall adjacent the combustion chamber whereby propellant flows from the interior thereof into the combustion chamber.

7. An injector for a rocket engine having a combustion chamber comprising a casing, a plurality of tubes secured to each other to form a tube bundle and mounted in the casing, said tubes being spaced from the interior of the casing to form a passage therebetween, alternate tubes of said tube bundle having openings in their side walls to provide communication between the passage and the interior of the tubes, means to supply a first propellant to the passage and through the openings in the side walls of the alternate tubes to the interior of the tubes, the remaining alternate tubes of the tube bundle having openings in their walls remote from the combustion chamber, means to supply a second propellant to the interior of the remaining alternate tubes through the openings in the walls remote from the combustion chamber, and each of said tubes having a plurality of orifices in its wall adjacent the combustion chamber whereby propellant flows from the interior thereof into the combustion chamber.

8. An injector for a rocket engine having a combustion chamber comprising a casing, a plurality of tubes secured to each other to form a tube bundle arranged substantially perpendicular to the axis of the engine and mounted in the casing, said tubes being spaced from the interior of the casing to form a passage therebetween, alternate tubes of said tube bundle having openings in their side walls to provide communication between the passage and the interior of the tubes, means to supply a first propellant to the passage and through the openings in the side walls of the alternate tubes to the interior of the tubes, the remaining alternate tubes of the tube bundle having openings in the walls remote from the combustion chamber, means to supply a second propellant to the interior of the remaining alternate tubes through the openings in the walls remote from the combustion chamber, and each of said tubes having a plurality of orifices in its wall adjacent the combustion chamber whereby propellant flows from the interior thereof into the combustion chamber.

9. An injector according to claim 7 in which said tubes are rectangular in cross section.

References Cited in the file of this patent

UNITED STATES PATENTS

| | | |
|---|---|---|
| 2,482,260 | Goddard | Sept. 20, 1949 |
| 2,575,070 | Reed et al. | Nov. 13, 1951 |
| 2,682,747 | Ruegg | July 6, 1954 |
| 2,706,887 | Grow | Apr. 26, 1955 |
| 2,733,570 | Macpherson | Feb. 7, 1956 |
| 2,753,687 | Wissley et al. | July 10, 1956 |